United States Patent [19]

Kroneld

[11] Patent Number: 4,635,379

[45] Date of Patent: Jan. 13, 1987

[54] METHOD OF DRYING MATERIAL USING AN INDIRECTLY HEATED SYSTEM

[76] Inventor: Erik G. Kroneld, Alvägen 5, S-852 43 Sundsvall, Sweden

[21] Appl. No.: 610,999

[22] PCT Filed: Sep. 14, 1983

[86] PCT No.: PCT/SE83/00328

§ 371 Date: May 14, 1984

§ 102(e) Date: May 14, 1984

[87] PCT Pub. No.: WO84/01207

PCT Pub. Date: Mar. 29, 1984

[30] Foreign Application Priority Data

Sep. 15, 1982 [SE] Sweden ............................ 8205276

[51] Int. Cl.$^4$ ............................................. F26B 3/04
[52] U.S. Cl. ................................... 34/25; 34/28; 34/35; 34/182; 110/228
[58] Field of Search ............... 110/224, 227, 228; 34/181, 182, 215, 216, 217, 35, 86, 25, 28, 31

[56] References Cited

U.S. PATENT DOCUMENTS

| | | | |
|---|---|---|---|
| 2,671,968 | 3/1954 | Criner | 34/216 |
| 2,816,372 | 12/1957 | Myers et al. | 34/216 |
| 3,783,527 | 1/1974 | Driscoll et al. | 34/56 |
| 4,253,825 | 3/1981 | Fasano | 34/86 |
| 4,290,269 | 9/1981 | Hedstrom et al. | 34/86 |

OTHER PUBLICATIONS

The Btab Drier–Swedish Paper Journal–Jun. 10, 1984.

*Primary Examiner*—Larry I. Schwartz
*Attorney, Agent, or Firm*—Burns, Doane, Swecker & Mathis

[57] ABSTRACT

The invention relates to a method of drying particle material in a bed under pressure by indirect heating. The method according to the invention is carried out so that the steam driven off from the material is superheated with heat of a higher temperature, that the steam is passed through the material bed, which is advanced slowly. The steam leaves the bed at a low speed, thereby preventing greater material particles from following along with the steam from the bed. The steam heat is recovered in a manner known per se.

15 Claims, 2 Drawing Figures

METHOD OF DRYING MATERIAL USING AN INDIRECTLY HEATED SYSTEM

This invention relates to a method of drying primarily solid fuels, such as bark, forestry waste material and the like. The drying method, of course, can be used also for other materials.

The drying is carried out indirectly in known manner, i.e. saturated steam from the fuel is superheated indirectly in a heat exchanger by heat of a higher temperature. The steam driven off can thereafter be converted in a suitable way, for example to process steam, or be utilized in some other way.

On the market a developed system is available, at which drying energy is recovered as process steam. Said system implies that the fuel is atomized and dried in a steam flow, which is superheated in steps during its passage through the drying system. Subsequent to the drying process, the fuel is separated from the steam in a cyclone, whereafter the fuel normally is used for dust firing. The particle size is limited by the relatively short staying time of the fuel in the drying process.

The present invention has the object to be a further development of the "dust drying process" described and is intended to be applied in firing installations where particles exceeding in size those mentioned above can and should be used, for example at grate firing or in a fluidized bed.

The invention offers the advantage, that the fuel need not be finely ground and be cleaned thereby from solid impurities, as required at dust firing in order to prevent rapid wear of the grinding and drying equipment. A further advantage is the very low speed of the drying steam at its contact with the fuel, implying that the cyclone equipment, which is required at dust drying where the entire fuel amount at a high speed follows along with the drying steam through the installation, can be abandoned. Solid fuels can according to known art be dried indirectly to a high dry content and be combusted in powder state. At the drying process the entire fuel amount follows along with the drying steam through the heat exchangers and is thereafter separated in a cyclone. After separation, the powder normally is blown to a burner. Other types of firing, of course, are possible, but are rarely used because the fuel must be well atomized for obtaining a sufficient dry content. The particle size normally should be <5 mm when a high dry content should be obtainable, and ≦1 mm at dust drying. The atomization of fuel to the aforesaid particle size implies high requirements on machinery equipment. As solid domestic fuels, such as bark and forestry waste material, normally include great amounts of impurities, such as sand, stones and metal pieces, the fuel must be cleaned carefully prior to its grinding in order to prevent costly wear of grinding and drying equipment. Such equipment is expensive and, of course, requires corresponding maintenance.

At firing methods such as grate firing and fluidized bed, the requirement on the particle size of the fuel is entirely different from what is required in the aforesaid dust drier. Particles with substantially greater dimensions, up to 25-30 mm for fluidized bed and even greater for grate firing, can be used. The firing installations, besides, are relatively insensitive to impurities of the aforesaid kind. When the impurities follow along with the fuel into the boiler, they normally leave the boiler together with the ashes without causing much trouble.

DETAILED DESCRIPTION OF A PREFERRED EMBODIMENT

Figure 1:
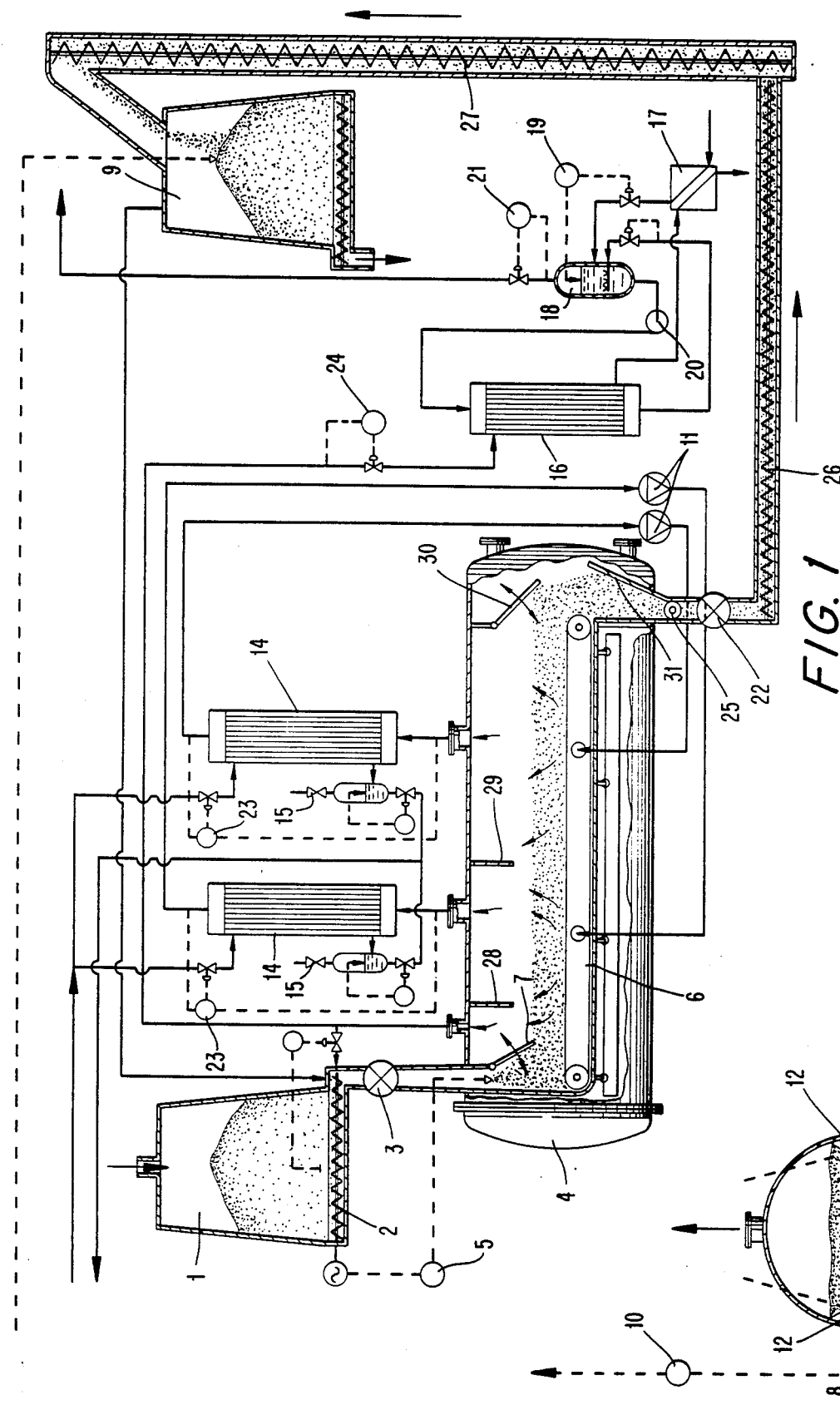
FIG. 1 depicts a schematic view of the preferred embodiment for carrying out the process of the invention.
Figure 2:
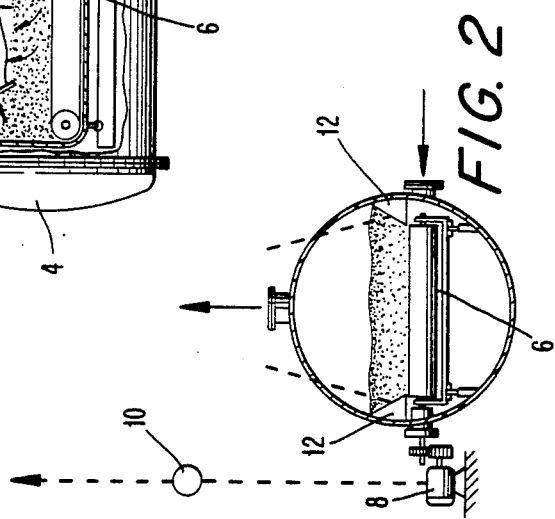
FIG. 2 is an enlarged schematic view taken along the length of the conveyor 6.

The present invention relates to a method of drying a fuel adapted for grate firing, fluidized bed and the like. Impurities following along with the fuel pass through the drier without causing damage thereon. The fuel is dried at overpressure and passed slowly on a belt of the type chain grate or the like through the drier. The water vapour driven off is utilized according to known art. The superheated drying steam is directed inward beneath the advancing chain grate and is pressed through the grate and fuel bed. The superheating heat thereby passes over to the bark bed to be dried and produces saturated steam. The steam leaving the bed has a very low speed, <1 m/s, so that only very small particles are capable to follow along with the steam out of the drier.

In this installation, compared to the "dust drying process", no equipment for fine-cleaning the fuel, no grinding equipment beyond that necessary for the firing technique in question, and no equipment for separating fuel from the drying steam, is required.

The equipment, further, is robust and reliable in operation. It is easily accessible for maintenance, because it can be simply drawn out of its pressure vessel. The speed of the chain grate is about 1 m/min. When carriers are attached on the chain grate, the equipment is self-cleaning. At the formation of channels in the fuel bed, the channels are broken down by "channel breakers".

The fuel in undried state is fed into a receiving bin 1. From there the fuel is passed by a screw 2 to a cell feeder 3, whereafter the fuel is charged to a drier 4. The fuel amount supplied to the drier is controlled by a level control 5, which adjusts the speed of the discharge screw 2 to the level in the feed slope to the drier 4. The fuel is fed from the feed slope inward onto the chain grate 6 of the drier. The thickness of the bed on the grate is controlled by a damper 7. The chain grate is operated by a drive means 8, which is controlled by the level in a dry fuel bin 9 and by a level equipment 10. Drying steam fans 11 feed superheated steam beneath the advancing grate, from where the steam is pressed through the grate into the fuel bed. The steam can pass only through the fuel bed, because it is prevented by two longitudinal strips 12 to leak past the bed sides. When steam channels develop in the fuel bed, they are broken by a stirring equipment. At its passage through the fuel bed, the steam delivers its superheating heat to the fuel, whereby new saturated steam is formed and the fuel is dried correspondingly. The drying steam now being saturated is directed out of the drier to the heat exchangers 14 where it is again superheated by steam from the boiler house. The fresh steam condensate from the heat exchangers is returned to the boiler house via condensate vessels 15. The drying steam superheated again is passed from the heat exchangers to the fans 11 for being transported further to the drier.

The steam evaporated from the fuel bed is passed from the drier to a steam converter 16 where it is condensed. The condensate is thereafter cooled against entering feed water in a heat exchanger 17. After heat exchange the condensate is conducted to an outlet or recycled to the process. From the feed water heat exchanger 17 the heated feed water is pumped to a pump vessel 18 via a level control device 19. From the pump vessel 18 the feed water is pumped further to the steam converter 16 via a pump 20 and thereafter is returned to the pump vessel 18, where the heat exchanged heat from the bark steam is vaporized and discharged to the process steam main circuit. The pressure in the process steam conduit is controlled by a control valve 21.

The pressure in the drier is maintained by the cell feeders 3 and 22 as well as by fresh steam valves 23, which always maintain the necessary heat transport to the fuel bed and by a pressure control valve 24 in the steam conduit to the steam converter 16. The dried fuel is directed via a discharge screw 25, the cell feeder 22, a screw 26 and a vertical screw 27 to the dry fuel bin 9. From the dry fuel bin the flash steam formed at the pressure drop after the cell feeder 22 is passed to the discharge screw 2 where it is utilized for preheating the fuel to the drier. As the temperature at the bottom of the feed bin should be held at about 100° C. in order to prevent air admixture in the drier, a sufficient amount of steam must be supplied to the fuel. This steam amount is taken from the saturated steam of the frier, if the flash steam amount is insufficient.

The invention is not restricted to the embodiment shown, but can be varied within the scope of the invention idea.

I claim:

1. Method of drying material in one or more steps comprising: feeding an indirectly heated superheated steam to a drier containing a pressurized bed of said material;
   passing the superheated steam in transverse flow through the bed; whereby water is driven off from the material to form a new saturated steam;
   keeping the material bed at a constant level;
   preventing superheated steam from bypassing the bed by means of a sealing device;
   distributing the new saturated steam in one or more circulation systems; and
   maintaining the pressurized bed of said material in said drier by cell feeders or plug screws.

2. The method as defined in claim 1 further comprising the step of increasing the temperature at the bottom of a vessel for undried material in advance to about 100° C. whereby air entrained with the undried material is displaced before the material enters the drier.

3. The method as defined in claim 1 further comprising the step of advancing the material by means of a self-cleaning chain mat.

4. The method as defined in claim 1 further comprising the step of stirring the bed in order to prevent channel formation.

5. The method as defined in claim 1 further comprising the step of controlling the bed thickness by a damper device at the material intake on the bed.

6. The method as defined in claim 3 further comprising the step of stirring the bed in order to prevent channel formation.

7. The method as defined in claim 3 further comprising the step of controlling the bed thickness by a damper device at the material intake on the bed.

8. The method as defined in claim 4 further comprising the step of controlling the bed thickness by a damper device at the material intake on the bed.

9. The method as defined in claim 6 further comprising the step of controlling the bed thickness by a damper device at the material intake on the bed.

10. The method as defined in claim 3 further comprising the step of increasing the temperature at the bottom of a vessel for undried material in advance to about 100° C. whereby air entrained with the undried material is displaced before the material enters the drier.

11. The method as defined in claim 4 further comprising the step of increasing the temperature at the bottom of a vessel for undried material in advance to about 100° C. whereby air entrained with the undried material is displaced before the material enters the drier.

12. The method as defined in claim 5 further comprising the step of increasing the temperature at the bottom of a vessel for undried material in advance to about 100° C. whereby air entrained with the undried material is displaced before the material enters the drier.

13. A method of drying material in one or more steps with an indirectly-heated superheated drying steam in a pressurized bed comprising the steps of:
    feeding said material into a pressurized drier to form a bed of material;
    maintaining the thickness of said bed substantially at a constant level;
    passing said superheated drying steam through said bed of material to form a new saturated drying steam, the material thereby being dried; and
    passing steam generated from the evaporation of moisture from said material in said drier to a steam converter.

14. The method of claim 13 further comprising the step of directing said saturated drying steam out of said pressurized drier to a heat exchanger where it is again superheated by another stream of steam.

15. The method as defined in claim 13 wherein said material comprises a solid fuel having particles up to at least about 25–30 mm in size.

* * * * *